US008103261B2

(12) United States Patent
Parker et al.

(10) Patent No.: US 8,103,261 B2
(45) Date of Patent: Jan. 24, 2012

(54) SECURE VALET TELEPHONE SYSTEM APPARATUS AND METHOD

(76) Inventors: Stephen Parker, Devon, PA (US); James Fox, Newtown, PA (US)

( * ) Notice: Subject to any disclaimer, the term of this patent is extended or adjusted under 35 U.S.C. 154(b) by 1500 days.

(21) Appl. No.: 11/581,685

(22) Filed: Oct. 16, 2006

(65) Prior Publication Data

US 2007/0123276 A1    May 31, 2007

(51) Int. Cl.
*H04M 3/42* (2006.01)
(52) U.S. Cl. .................. 455/417; 455/422.1; 455/426.1; 455/426.2; 455/445; 455/459; 379/188; 379/200
(58) Field of Classification Search ............. 455/422.12, 455/426.1, 426.2, 445, 415, 459, 461; 379/188–191, 379/200
See application file for complete search history.

(56) References Cited

U.S. PATENT DOCUMENTS

| | | | |
|---|---|---|---|
| 4,277,649 A | 7/1981 | Sheinbein |
| 5,206,900 A | 4/1993 | Callele |
| 5,259,026 A | 11/1993 | Johnson |
| 5,327,486 A | 7/1994 | Wolf |
| 5,339,352 A | 8/1994 | Armstrong |
| 5,487,111 A | 1/1996 | Slusky |
| 5,548,636 A | 8/1996 | Bannister |
| 5,592,541 A | 1/1997 | Fleisher |
| 5,706,339 A | 1/1998 | Elsdorfer |
| 5,724,411 A | 3/1998 | Elsdorfer |
| 5,737,700 A | 4/1998 | Cox |
| 5,742,674 A | 4/1998 | Jain |
| 5,797,092 A | 8/1998 | Cox |
| 5,896,448 A | 4/1999 | Holt |
| 5,905,789 A | 5/1999 | Will |
| 5,917,891 A | 6/1999 | Will |
| 5,940,493 A | 8/1999 | Desal |
| 5,943,417 A | 8/1999 | Cox |
| 5,987,110 A | 11/1999 | Malik |
| 6,035,217 A | 3/2000 | Kravitz |
| 6,075,860 A | 6/2000 | Ketcham |
| 6,130,938 A | 10/2000 | Erb |
| 6,249,579 B1 | 6/2001 | Bushnell |
| 6,396,920 B1 | 5/2002 | Cox |
| 6,404,884 B1 | 6/2002 | Marwell |
| 6,456,709 B1 | 9/2002 | Cox |

(Continued)

OTHER PUBLICATIONS

Author: SOS Wireless Communications; web page for SOS Emergency Phone, Aug. 15, 2001, from the Internet Archive, hard copy attached.

*Primary Examiner* — Kamran Afshar
*Assistant Examiner* — Sayed T Zewari
(74) *Attorney, Agent, or Firm* — Robert J. Yarbrough; Lipton, Weinberger & Husick

(57) ABSTRACT

The Invention is an apparatus and method of providing a valet telephone service. A dedicated wireless telephone is provided to a subscriber as a benefit of subscription. The dedicated wireless telephone will place calls only to and receive calls only from a service provider central computer. Incoming and outgoing calls to or from subscriber over said dedicated wireless telephone are screened or completed by an operator. Outgoing calls are completed by the operator to private contacts at locations ranked by time of day and day of the week. Incoming calls to subscriber are connected to subscriber at locations ranked by time of day and day of the week. Calls to subscriber outside telephone numbers are forwarded permanently to the central computer and screened by the operator.

22 Claims, 11 Drawing Sheets

U.S. PATENT DOCUMENTS

| | | |
|---|---|---|
| 6,546,005 B1 | 4/2003 | Berkley |
| 6,587,867 B1 | 7/2003 | Miller |
| 6,647,107 B1 | 11/2003 | Horrer |
| 6,668,049 B1 | 12/2003 | Koch |
| 6,668,055 B2 | 12/2003 | Marwell |
| 6,678,366 B1 | 1/2004 | Burger |
| 6,745,326 B1 | 6/2004 | Wary |
| 6,754,325 B1 | 6/2004 | Silver |
| 6,754,326 B2 | 6/2004 | Cox |
| 6,754,486 B2 | 6/2004 | Cox |
| 6,771,761 B1 | 8/2004 | LaPierre |
| 6,788,931 B2 | 9/2004 | Cox |
| 6,792,082 B1 | 9/2004 | Levine |
| 6,804,338 B1 | 10/2004 | Chen |
| 6,804,343 B2 | 10/2004 | Hafez |
| 6,813,346 B2 | 11/2004 | Gruchala |
| 6,862,350 B2 | 3/2005 | Dendy |
| 6,917,678 B2 | 7/2005 | Cox |
| 6,928,421 B2 | 8/2005 | Craig |
| 6,934,378 B2 | 8/2005 | Baker |
| 6,944,279 B2 | 9/2005 | Elsey et al. |
| 6,944,442 B2 | 9/2005 | Mooney |
| 6,947,730 B2 | 9/2005 | Ho |
| 6,959,077 B1 | 10/2005 | Calhoun |
| 6,970,548 B2 | 11/2005 | Pines |
| 6,999,573 B2 | 2/2006 | Weaver |
| 7,024,183 B2 | 4/2006 | Hymel |
| 7,027,807 B2 | 4/2006 | Keller |
| 2002/0057784 A1 | 5/2002 | Cox |
| 2002/0057788 A1 | 5/2002 | Cox |
| 2002/0085702 A1 | 7/2002 | Cox |
| 2002/0128033 A1* | 9/2002 | Burgess ............... 455/528 |
| 2002/0196922 A1 | 12/2002 | Marwell |
| 2003/0007620 A1 | 1/2003 | Elsey |
| 2003/0007625 A1 | 1/2003 | Pines |
| 2003/0007627 A1 | 1/2003 | Elsey |
| 2003/0026405 A1 | 2/2003 | Elsey |
| 2003/0165223 A1 | 9/2003 | Timmins |
| 2003/0194075 A1 | 10/2003 | McGrath |
| 2004/0062373 A1 | 4/2004 | Baker |
| 2004/0082320 A1 | 4/2004 | Cox |
| 2004/0096043 A1 | 5/2004 | Timmins |
| 2005/0152527 A1 | 7/2005 | Kent |
| 2005/0204030 A1 | 9/2005 | Koch |
| 2005/0227676 A1 | 10/2005 | DeVries |
| 2005/0227681 A1 | 10/2005 | Li |
| 2005/0250482 A1 | 11/2005 | Seligman |
| 2005/0272410 A1 | 12/2005 | Chen |
| 2005/0286688 A1 | 12/2005 | Scherer |

* cited by examiner

```
┌─────────────────────────────────────────────┐
│ Central computer receives calls from subscriber │
│ or from a contact                            │
└─────────────────────────────────────────────┘
                      │
┌─────────────────────────────────────────────┐
│ Central computer records the time of the call│
│ and the location of the calling subscriber or│
│ contact                                      │
└─────────────────────────────────────────────┘
                      │
┌─────────────────────────────────────────────┐
│ Central computer compares the number of calls│
│ received from various locations for subscriber│
│ or contact by day and time                   │
└─────────────────────────────────────────────┘
                      │
┌─────────────────────────────────────────────┐
│ Central computer permanently re-ranks        │
│ locations at which to reach subscriber or    │
│ contact – locations from which more calls are│
│ received are ranked higher and locations from│
│ which fewer calls are received are ranked    │
│ lower.                                       │
└─────────────────────────────────────────────┘
```

FIG. 9

SECURE VALET TELEPHONE SYSTEM APPARATUS AND METHOD

I. RELATED APPLICATIONS

The present application is entitled to priority from provisional application No. 60/499,257 filed on Aug. 29, 2003 and U.S. utility patent application publication No. 2005/0047575 published Mar. 3, 2005, U.S. utility patent application Ser. No. 10/889,410, which are incorporated by reference as if set forth in full herein.

II. BACKGROUND OF THE INVENTION

A. Field of the Invention

The Invention is valet telephone service allowing a subscriber to place and receive telephone calls with operator assistance. Specifically, the Invention is a method and apparatus by which all calls to or by a subscriber are placed or received through a live operator using a dedicated telephone and including security features. The method and apparatus of the Invention provides convenience to the subscriber while also providing security for the subscriber's personal information.

B. Description of the Related Art

Most persons find that access to wireless or wireline communications is a necessity of daily life. A tension exists between the need for ready access to communications and the need to limit unwanted access by others. The problem is acute for those who have achieved public recognition. Such persons may enjoy little privacy due to the unwelcome attention of other persons.

Information security is, or should be, a priority for a person who has achieved public recognition. The need for information security particularly applies to telephone numbers at which the person, family members and personal contacts of the person may be reached. In the prior art, a person may employ a secretary or personal assistant to complete telephone calls and to screen incoming calls. Aside from issues of cost, a secretary or personal assistant may be of limited use in protecting the privacy of the person in situations where the person has multiple wireline and wireless telecommunication devices, including devices carried by the person. A leak of, say, the wireless telephone number of the person will allow unwelcome telephone calls that are not screened by the personal assistant, rendering the wireless telephone useless and defeating the goal of ready access to communications.

The prior art does not teach the telephone valet service method and apparatus of the Invention.

III. SUMMARY OF THE INVENTION

The Invention is an operator-assisted apparatus and method to handle both incoming calls and outgoing calls. A person, hereinafter a "subscriber," subscribes to a telephone valet service offered by a service provider. In the valet telephone service of the Invention, the service provider supplies one or more dedicated wireline or dedicated wireless telephones to the subscriber as a benefit of subscription. The dedicated telephones are not general use telephones and have limited keypads and limited memories. A wireline telephone may have no keys at all and may be equipped with an automatic dialer or equivalent that automatically connects the wireline telephone to the service provider when the handset is lifted. A dedicated wireless telephone has less than a full telephone keypad and may have very few keys, such as three keys.

The dedicated wireline or wireless telephone requires few or no keys because the dedicated telephone is equipped only to place calls to or receive calls from a service provider central computer. Dedicated wireline or wireless telephone memory is programmed to store only the telephone number of the central computer and is not equipped to place a call to any other telephone number. The subscriber therefore cannot inadvertently release the telephone number of the dedicated telephone by calling a telephone that may harvest and subsequently leak the Automatic Number Identification (ANI), Electronic Serial Number (ESN), Mobile Equipment Identifier (MEID), Mobile Identification Number (MIN) or any other identifying data of the dedicated telephone that is or may be transmitted with the telephone call. In addition, loss or theft of the dedicated wireless telephone will not compromise any private information of subscriber because the dedicated wireless telephone does not and can not store any private information.

When the dedicated telephone is programmed with a telephone number by the service provider, the number is known only to the central computer of the service provider and is stored in encrypted form. The direct telephone number of the dedicated wireline or wireless telephone is not known by the subscriber, by a service provider employee or by anyone else. No one other than the central computer of the service provider may place a call to the dedicated wireline or wireless telephone. No employee of the service provider or anyone else is in a position to leak the telephone number of the dedicated wireline or wireless telephone of the subscriber. The subscriber may be assured that when the subscriber's dedicated wireline or wireless telephone rings, a human operator employed by the service provider, and no one else, will be on the other end of the telephone connection.

To provide for operator screening of all calls to the subscriber, all incoming calls to telephone numbers associated with the subscriber (referred to herein as "outside subscriber telephone numbers") are permanently forwarded to the central computer. Examples of 'outside subscriber telephone numbers' include public business or home telephone numbers of subscriber. When a person calls any of the outside subscriber telephone numbers, the central computer receives the incoming call and refers the call to the human operator employed by the service provider. The operator answers and screens the incoming call in conjunction with the central computer and as directed by the subscriber and as more fully described below. If the caller is one from whom the subscriber wishes to receive calls, the operator will consult a subscriber location database comprising a ranked list of locations at which to reach subscriber. The list of locations for subscriber is ranked by time of day and day of the week. If the call survives the screening step, the operator will instruct the central computer to connect the incoming call to the subscriber at the top-ranked location for that time of day and day of the week. The central computer will consult the subscriber location database and will dial the telephone number stored in the database corresponding to the top-ranked location. The list of locations may include the dedicated wireline or wireless telephone and may include other telephones at which a subscriber may be reached.

The central computer will store an encrypted private contact database including a list of names and locations of individuals or other entities as private contacts for subscriber along with telephone numbers at which to reach the private contacts. Where a contact has more than one associated location, the locations and telephone numbers associated with the locations are ranked by time of day and day of the week. When the subscriber uses a dedicated wireline or wireless telephone to place an outgoing call, the central computer receives the outgoing call from subscriber and connects the subscriber to the human operator. The central computer receives ANI, MIN or other identifying data from the subscriber's dedicated wireline or wireless telephone and automatically identifies the subscriber. The names of the private contacts on subscriber's contact list are displayed to the operator along with the ranked locations at which to reach each private contact. Preferably the central computer retrieves the subscriber's private contact names and private contact locations and displays the contact names and locations to the operator by the time that the operator greets the subscriber. The subscriber directs the operator to connect the subscriber with a person on the subscriber's contact list. The operator selects the top-ranked location for the requested contact for the day and time of the call and completes the outgoing call to the top-ranked location for that contact.

The telephones of subscriber or of a person on the private contact list of subscriber are identified to the operator by name or location and not by telephone number. The telephone numbers for subscriber and for private contacts are never displayed to the operator and the operator never has the opportunity to view a telephone number for subscriber or for a private contact. The information security risk posed by the human operators therefore is minimized.

Security features are provided for initially entering subscriber's private contact information in a private contact database and subscriber's personal information in a subscriber location database, including locations and multiple telephone numbers at which subscriber or a private contact may be reached. When the subscriber subscribes to the service and at such other time as agreed by subscriber and service provider, a representative of the service provider travels to a location specified by the subscriber, such as the subscriber's residence or place of business. The subscriber provides to the service provider representative a list of locations and telephone numbers at which to reach subscriber ranked by day and time. The subscriber also provides to the service provider representative a list of private contacts by name, location and telephone numbers for each location for the private contacts ranked by day of the week and time of day. The subscriber representative manually enters the names, locations and telephone numbers into the memory of a laptop computer or other portable computing device supplied by the service provider. Alternatively, and for greater security, the subscriber or a personal assistant to the subscriber may enter the private contact information and subscriber information into the memory of the laptop. The laptop may be configured to download the subscriber information and private contact information by a direct connection, such as a wired connection that does not utilize a computer network, from a personal digital assistant or other computing device in which subscriber stores the information.

The service provider representative will instruct the laptop computer to encrypt the subscriber locations, telephone numbers and rankings and the private contact names, locations, telephone numbers and rankings of the subscriber database and the private contact database into an encrypted data file. The service provider representative then will connect the laptop to a wireline telephone line at the subscriber's premises. The subscriber representative will dial the central computer of the service provider directly using a modem incorporated into the laptop computer and will not use the Internet. The encrypted data file will be uploaded from the laptop to the central computer through a port. The central computer will associate the encrypted data file with the subscriber and will store the encrypted data file in encrypted form.

When the upload is complete, service provider will take any of three actions to assure the subscriber that the subscriber data is safe from theft or other information security breach. The service provider representative may give the laptop to the subscriber, thereby providing the subscriber ownership and control over the laptop and its contents. The service provider may remove the hard drive from the laptop and present the hard drive to the subscriber or destroy the hard drive. Alternatively, the service provider representative may erase the hard drive in the presence of the subscriber or the subscriber's personal representative, as by reformatting the drive. The subscriber thus can be assured that the subscriber's private information will not be released through theft or loss of the laptop, either by mistake or misadventure.

The subscriber may update securely the private contact list, the contact information for subscriber and the ranking of locations and telephone numbers at which to reach the subscriber or a contact by the means described above for initial entry of information. The subscriber also may telephone the central computer and ask the operator to be referred to an update service. The update service is an automated system administered by the central computer utilizing speech recognition to receive updated information. The central computer leads the subscriber through a series of voice-actuated menus. The central computer records the responses of the subscriber to the menus and updates the subscriber information and private contact database accordingly. The subscriber's personal information is not disclosed to a human being and the security risk of such a disclosure therefore is avoided.

All information relating to the location information and telephone numbers contained in subscriber's subscriber location database and for each listing in subscriber's private contact database is maintained in encrypted form so that the information may not be accessed if the encrypted data file is stolen or otherwise escapes from the central computer memory. The central computer is configured so that the central computer has no means to connect to the Internet. The central computer therefore is immune from Internet-based hacking attacks.

The subscriber's private contact list also may be populated using a call-trap feature. When the central computer receives an incoming telephone call, the central computer detects and extracts ANI, ESN, MEID, MIN or other data accompanying the dial string of the call, as is known in the art. The extracted data identifies the telephone number of the calling telephone. The central computer will record the extracted telephone number and refer the incoming call to the human operator. The operator verbally requests that the calling party disclose the name of the calling party and the name of the subscriber. The operator enters the name of the calling party into a computer terminal as a new contact and selects the appropriate subscriber. The central computer receives the name entered by the operator and associates the name with the telephone number extracted from the incoming call. The name and telephone number of the calling party are encrypted and added to the private contact list of the subscriber so that the subscriber may request the person by name in the future and be connected to the person by the operator.

If the name of the calling party is already in the private contact list of the subscriber but the calling telephone number is not in the database, then the calling telephone number is added at the bottom of the ranked list for the calling party.

This call-trap feature is also used to provide additional contact locations in the private contact lists of other subscribers. If the calling person attempting to reach a subscriber is listed as a private contact in the private contact lists of any of the other subscribers, then the telephone number of the calling telephone is added to the contact locations for the calling person for the private contact list of each subscriber who lists the calling person as a private contact. The call-trap feature therefore allows the private contact lists of all subscribers to be updated without active participation by any subscriber.

The ranked locations at which to reach the subscriber or a contact in the private contact database may be temporarily overridden based on calling information received by the central computer. The central computer will record the time that each call is received. For an incoming call received from a private contact to a subscriber, the service provider will record the telephone number of the telephone from which the call is received. For a predetermined period of time, for example, thirty minutes, after the central computer receives the call from the private contact to the subscriber, the central computer will override the locations at which to reach the private contact and will indicate that the location associated with the telephone number from which the call was received is the top-ranked location for that private contact. If the subscriber asks the operator to connect the subscriber to that private contact during the predetermined period of time, the operator will instruct the central computer to dial the telephone number associated with that top-ranked location.

A similar temporary override applies to the ranked list of locations and telephone numbers at which to reach the subscriber. The central computer will record the time of receipt of a call to the central computer from the subscriber along with the location from which the subscriber placed the call. If a subsequent incoming call is received for subscriber within a predetermined period of time after the call by the subscriber, the central computer will display the location from which the subscriber placed the call as the top-ranked location at which to reach the subscriber.

Other means for re-ranking the ranked lists also are disclosed.

The ranked list of locations at which to reach a subscriber may be overridden based on Global Positioning System (GPS) information received from the subscriber. The dedicated wireless telephone provided to subscriber may be equipped with a GPS receiver. The GPS receiver will determine the location of the dedicated telephone using conventional techniques of triangulation from global positioning system satellites. The dedicated telephone will periodically transmit the location information to the central computer. When an incoming call to the central computer is received for the subscriber, the location on the ranked list of locations at which to reach subscriber will be re-ranked so that the location that is closest to the most recent GPS-determined location of the dedicated wireless telephone will be displayed to the operator as the top-ranked location for subscriber.

The central computer alternatively may track the location of the subscriber using triangulation of the signal of the subscriber using cellular telephone towers, as is known in the art. The ranked list of locations at which to reach subscriber may be overridden so that the location on the ranked list in closest proximity to the dedicated wireless telephone as determined by triangulation of cellular telephone towers is displayed to the operator as the top-ranked location at which to reach subscriber.

Where the central computer tracks the location of the subscriber using GPS signals or triangulation of a cellular telephone signal, the record of the subscriber's location presents confidential information. To minimize any chance of a toss of information, the central computer erases and overwrites location information for subscriber after a predetermined period of time, for example, eight hours. The central computer therefore maintains no more than, for example, eight hours of location information for subscriber.

IV. BRIEF DESCRIPTION OF THE DRAWINGS

FIG. 9 is a flowchart of a method for a re-ranking of the ranked list based on calls received from a contact.

V. DETAILED DESCRIPTION OF AN EMBODIMENT

The Invention is valet telephone system apparatus and method allowing a subscriber to place and receive telephone calls with operator assistance. A goal of the apparatus and method of the Invention is to provide ready access by the subscriber to wireline or wireless communications while blocking unwanted access to the subscriber. A necessary corollary to blocking unwanted access is providing an appropriate level of information security to prevent release of personal information of the subscriber through either accident or misadventure.

Figure 1:
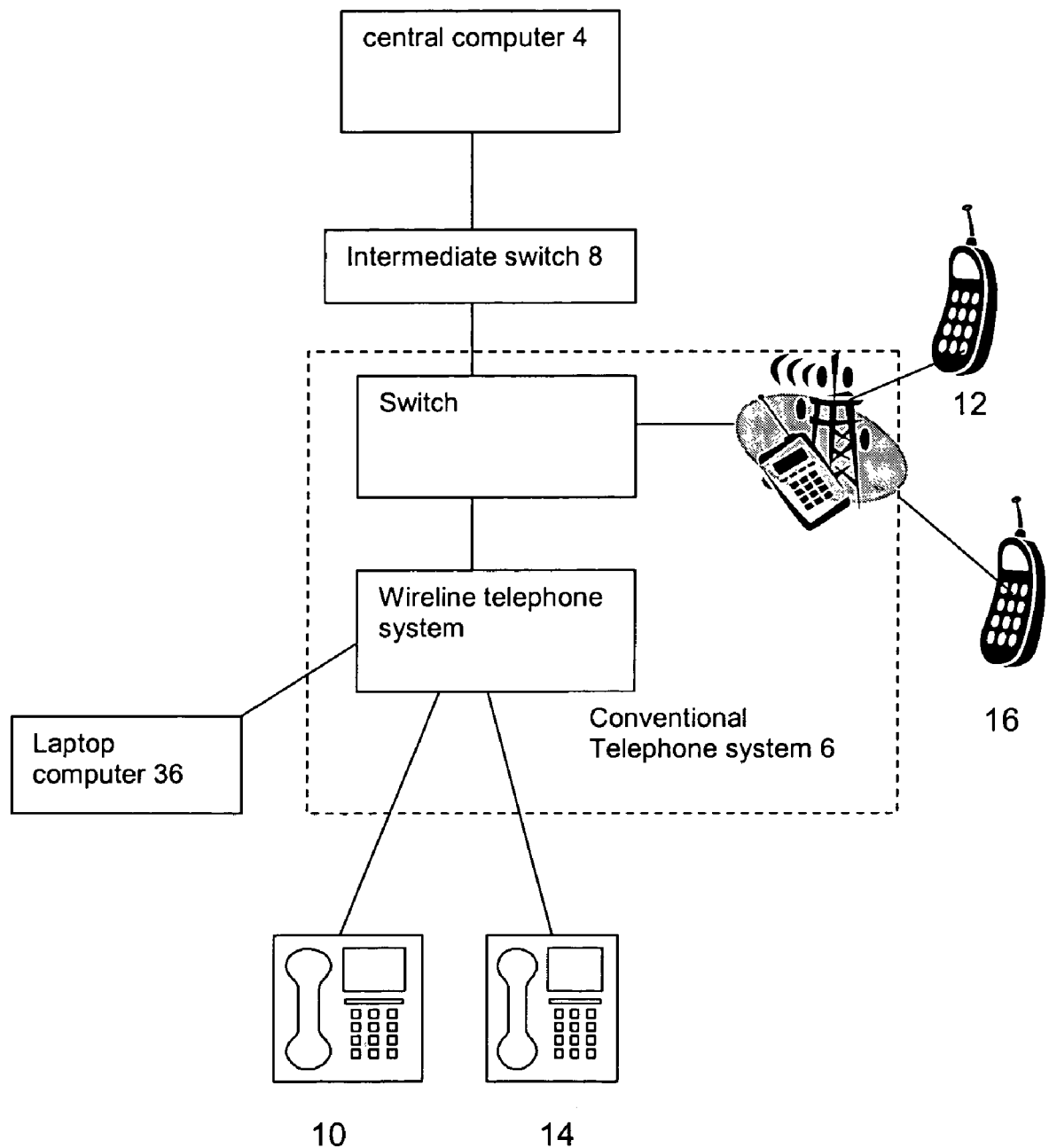
FIG. 1 is a schematic diagram of the relationship between the central computer and the telephones of subscriber and of other persons.
Figure 2:
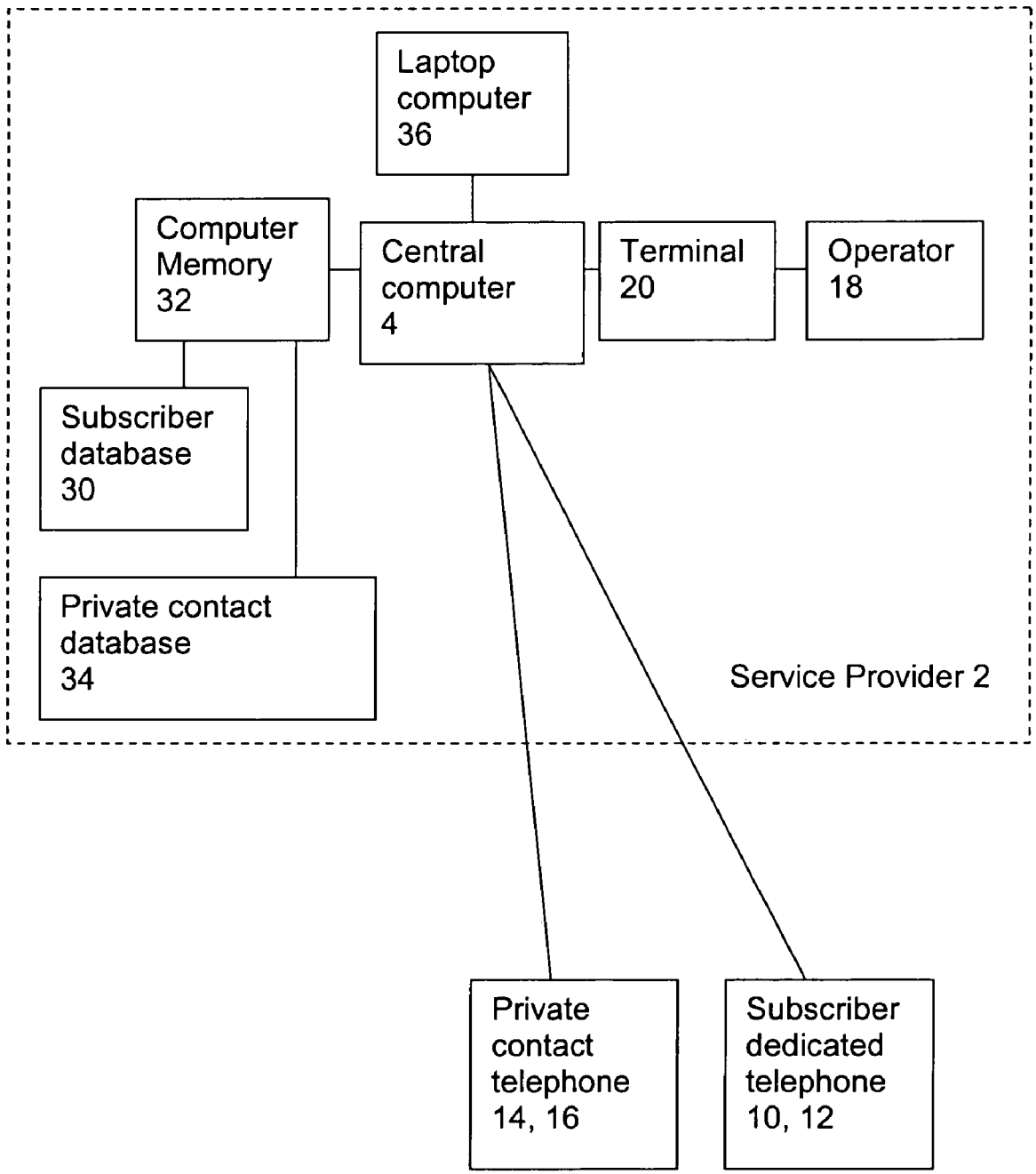
FIG. 2 is a schematic diagram of information flow to and from the central computer.

As shown by FIGS. 1 and 2, a subscriber will subscribe to the valet telephone service of the Invention offered by the services provider 2. The services provider 2 maintains a central computer 4. The central computer 4 is connected to the conventional telephone system 6 through an intermediate switch 8; namely, a switch that does not provide a dial tone to users and that receives and transmits calls through another switch. The central computer 4 communicates with a dedicated wireline telephone 10 or a dedicated wireless telephone 12 supplied to a subscriber by the service provider 2. The central computer 4 also is configured to communicate with a third party wireline or wireless telephone 14, 16.

As shown by FIGS. 1 and 2, the central computer 4 receives calls from subscribers using dedicated wireline or wireless telephones 10, 12 and from third party callers using third party telephones 14, 16. The central computer 2 routes those calls to operators 18 at operator terminals 20. The operator terminals 20 are "dumb terminals" that have neither a central processing unit nor a computer memory. The dumb terminals 20 are merely communication devices by which the operators 18 may communicate with the central computer 4. The central computer 4 is programmed to maintain subscriber and caller telephone numbers in encrypted form and does not display that information to the operators or to other service provider employees. The central computer 4 is not connected with the Internet and therefore is not vulnerable to Internet-based attacks.

The services provider 2 provides the subscriber with one or more dedicated telephones 10, 12, either landline or wireless, as a benefit of subscription. The dedicated telephones 10, 12 are configured to place an outgoing call only the service provider's central computer 4. The dedicated telephones 10, 12 also are configured to receive incoming calls only from the service provider's central computer 4. The central computer 4 is configured so that any call to or from the central computer 4 must be answered by human operator 18. The participation of the operator 18 therefore is necessary to place or to receive a call to or from the dedicated telephones 10, 12.

Figure 3:
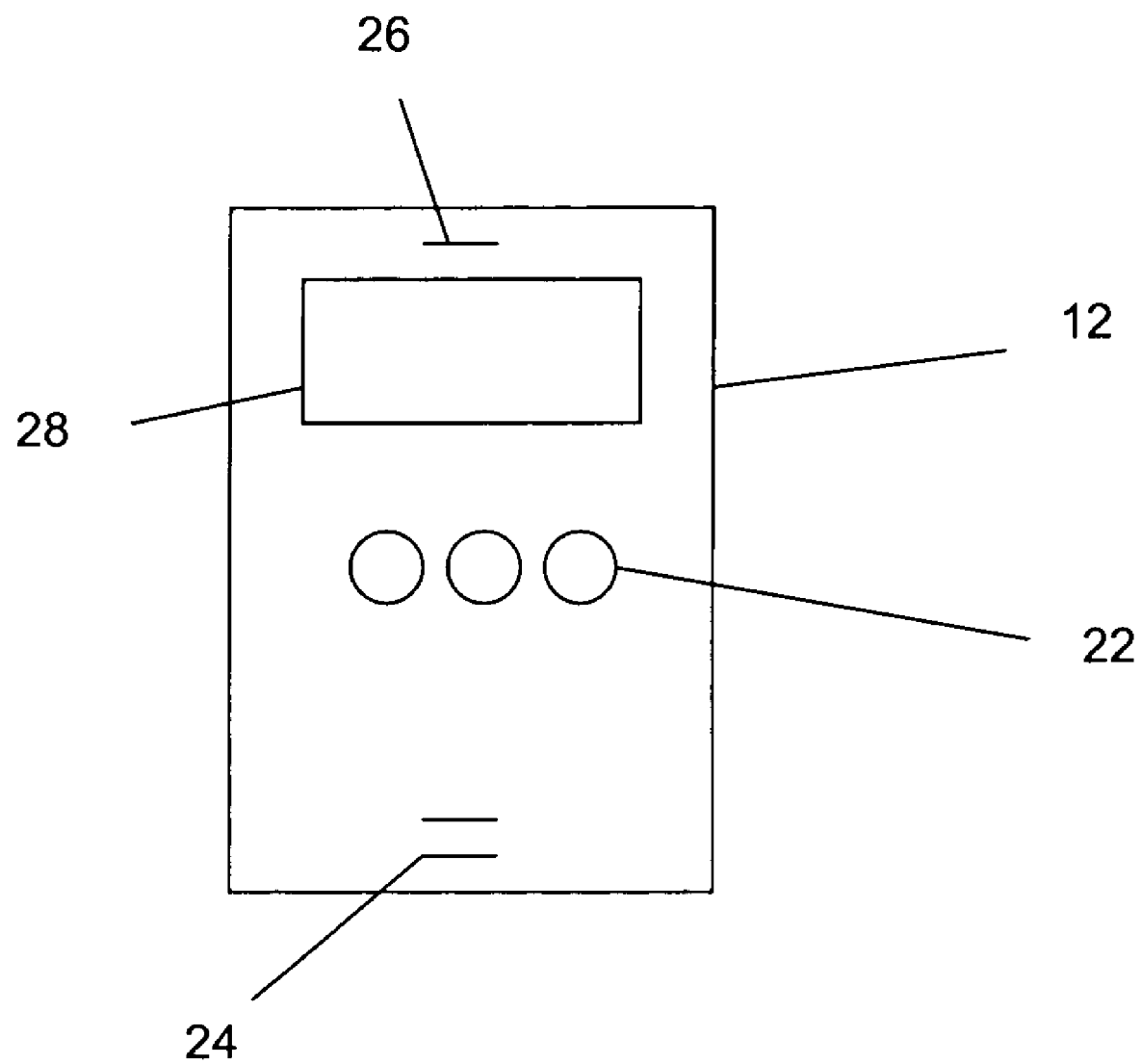
FIG. 3 is a dedicated wireless telephone.

The dedicated telephones 10, 12 are not conventional general use telephones and do not have full keypads. The dedicated wire line telephone 10 may have no keys at all and may be equipped with an automatic dialer or equivalent that is activated whenever the handset is lifted. The dedicated wireless telephone 12, as shown by FIG. 3, may have a limited number of keys, such as three. The dedicated wireless telephone 12 has a microphone 24 and speaker 26. The dedicated wireless telephone may have a screen 28. When the dedicated wireless telephone 12 is turned on, a single key press connects the subscriber to the central computer 4 and hence to the operator 18.

The dedicated telephones 10, 12 do not store telephone numbers in memory, other than telephone numbers necessary to connect to the service provider's central computer 4. Loss or theft of a dedicated telephone 10, 12 therefore cannot jeopardize confidential information of subscriber. The telephone numbers of the dedicated wireless telephone 12 and the dedicated wireline telephone 10 are known only to the service provider's central computer 4. The central computer 4 is programmed not to disclose numbers of dedicated telephones 10, 12 to the operator 18, to the subscriber or to any other person. The telephone number of the dedicated telephone 10, 12 of subscriber therefore will not be lost, stolen or hacked. Any incoming call to subscriber using the system of the Invention must pass through the human operator 18 and be screened by the operator 18 before being connected to the subscriber.

The operator 18 may connect incoming calls to the subscriber through the dedicated telephones 10, 12. Alternatively, the operator 18 may connect incoming calls to any other telephone at which the subscriber may be reached; for example, an office telephone number. For example, the central computer 4 may advise the operator 18 to connect the incoming call to the wireline 'office' telephone during mornings and afternoons on weekdays, and to the dedicated wireless telephone 12 between 5:00 and 6:00 pm, during the subscriber's commute. The list of locations at which subscriber may be reached, including dedicated telephones 10, 12, are ranked by time of day and day of the week and stored as an encrypted subscriber database 30 in computer memory 32. Each location in the subscriber database 30 presented to the operator 18 has an associated telephone number. The location is displayed to the operator 18 on operator terminal 20, but the corresponding telephone number is not displayed to the operator 18 to preserve information security.

When the central computer 4 receives an incoming call to a subscriber, the central computer 4 connects the incoming call to operator 18. Operator 18 greets the caller and asks for the identity of the subscriber to whom the incoming call is directed. In response to an instruction from the operator 18, central computer 4 retrieves and decrypts the ranked list of locations at which to reach the subscriber and displays the ranked list of locations to operator 18. Consistent with the instructions of subscriber as described below, the operator 18 will select the top-ranked location at which to reach the subscriber and will instruct the central computer 4 to call the subscriber at the top-ranked location. The operator 18 then will connect the subscriber to the caller.

Figure 4:
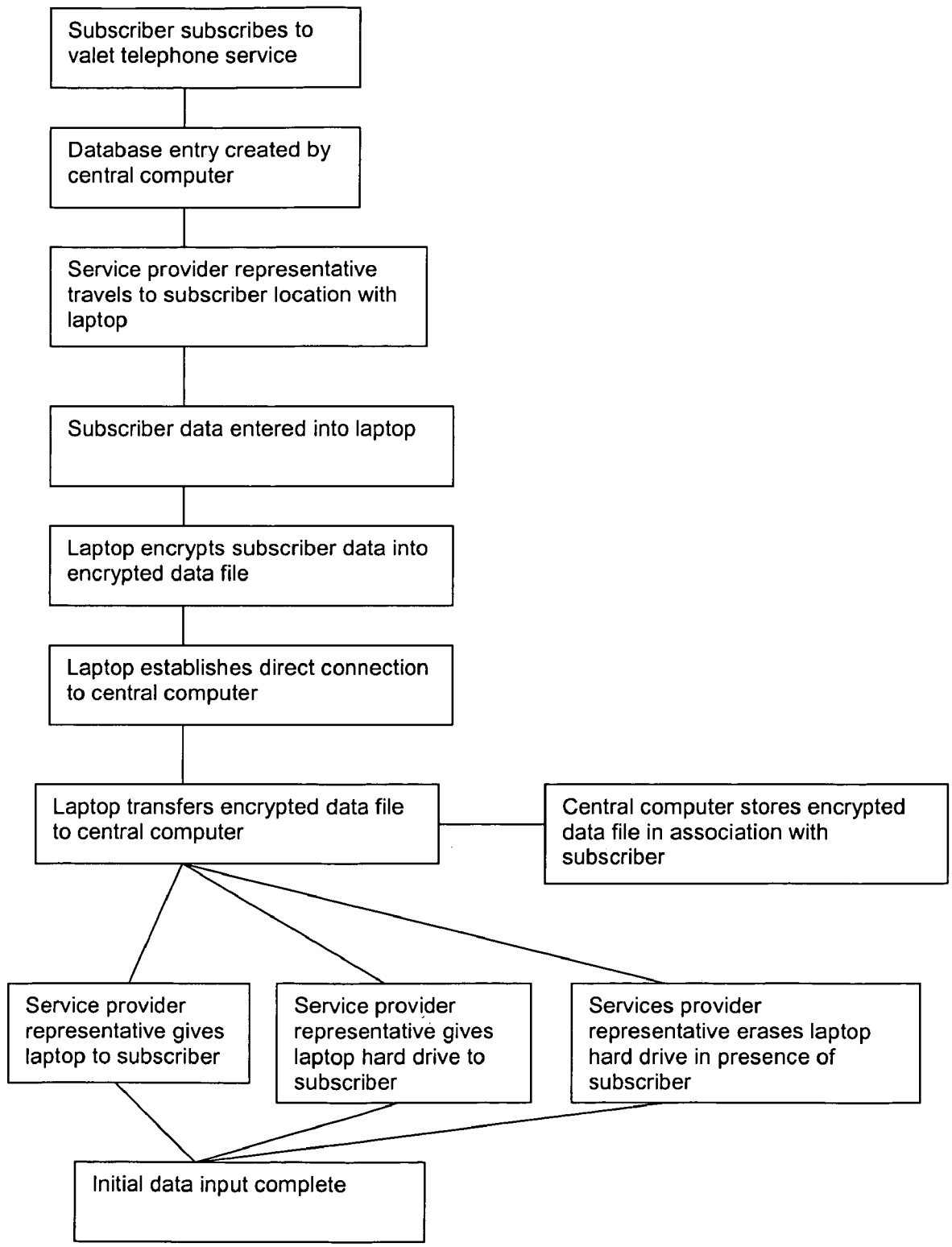
FIG. 4 is a flowchart of the initial data entry process.

As shown by FIG. 4, at the time that the subscriber subscribes to the valet telephone service of the Invention, the subscriber database 30 of subscriber locations, telephone numbers and ranking by day and time must be created and populated. The private contact database 34 of names, locations, telephone numbers, all ranked by day and time also must be created and populated. The initial population of the databases 30, 34 occurs securely through a visit by a service provider representative to a location specified by the subscriber, such as the subscriber's residence or place of business.

From FIG. 4, to create and initially populate the databases 30, 34, the subscriber first subscribes to the valet telephone service and the central computer 4 creates databases 30, 34 for subscriber. Depending on the desires of the subscriber, a technician travels to the business or home of the subscriber with a laptop computer 36 supplied by the service provider. In this context, the term "laptop computer 36" means any portable computing device capable of receiving, storing, encrypting, and transmitting data over a wired telephone line. The technician, the subscriber or the personal assistant of the subscriber wilt enter subscriber database 30 information, including locations at which the subscriber may be reached ranked by day of the week and time of day, and telephone numbers corresponding to the locations. The technician, the subscriber or the personal assistant of the subscriber will manually enter the personal contact database 34 information, including the ranked locations and telephone numbers for private contacts of subscriber into the laptop computer 36. Where the subscriber has more than one telephone number for a contact, the technician, the subscriber or the subscriber's personal assistance will rank the preferred locations at which to reach the contact by day of the week and time of day.

As shown by FIG. 4, the subscriber will designate each contact as an 'A,' 'B' or 'C' contact. Persons on the 'A' list are family and close friends or associates of the subscriber. A person on the 'B' list is a person from whom the subscriber has accepted at least one call and from whom the subscriber is willing to accept calls. A person on the 'C' list is a person from whom the subscriber has not accepted a call or from whom the subscriber does not wish to accept a call. The designation of the contact determines the options available to the contact when the contact calls the subscriber, as described below relating to receiving calls.

The laptop computer 36 stores the information in an encrypted data file readable by the central computer 4. The customer service representative uses a modem of the laptop 36 to dial the central computer 4 over a conventional wireline telephone connection. The central computer 4 receives the call at a port, associates the encrypted data file with the subscriber and stores the encrypted file as an encrypted subscriber database 30 and encrypted private contact database 34 in computer memory 32.

From FIG. 4, the service provider representative then takes any of three actions, as approved by the subscriber: first, the service provider representative may give the laptop computer 36 to the subscriber, transferring custody and control over the information stored in the laptop 36 memory to the subscriber. Second, the service provider representative may remove the hard drive or other computer memory from the laptop computer 36 and transfer custody and control over the memory to the subscriber. Finally, the service provider representative may erase the encrypted files from the hard drive of the Laptop computer 36, as by reformatting the hard drive. The actions by the service provider representative ensure that the subscriber's information cannot be jeopardized by loss or theft of the laptop 36 while in the custody of the service provider.

The subscriber may update the subscriber and private contact databases 30, 34 through another visit by a services provider representative to a location specified by subscriber, as described above relating to FIG. 4. Alternatively, the subscriber may utilize an automated speech recognition system to allow the subscriber to update the subscriber database 30 and private contact database 34 without revealing the information to the operator 18 or to any employee of the services provider. The automated speech recognition update system is illustrated by FIG. 5.

Figure 5:
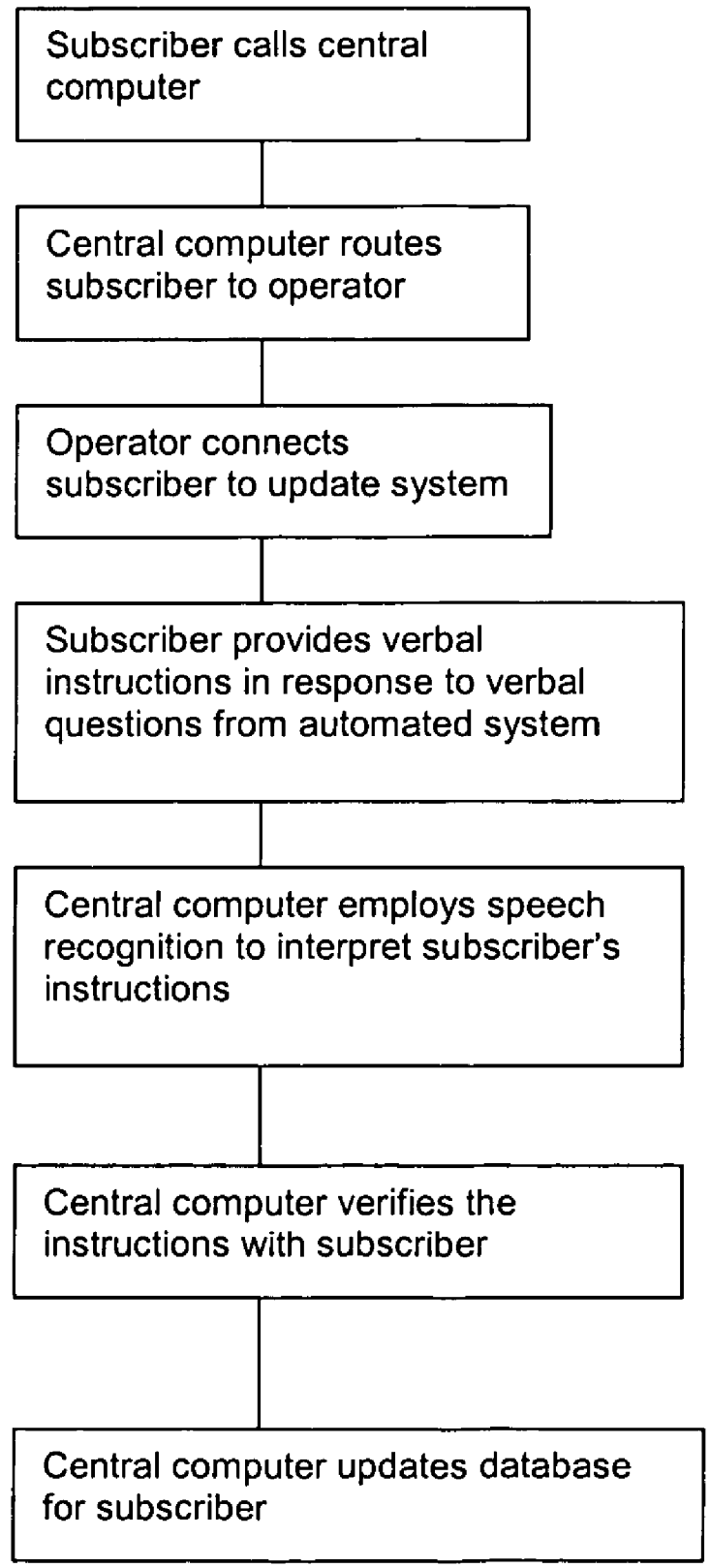
FIG. 5 is flowchart of a database update process.

To use the automated speech recognition system of FIG. 5, the subscriber will telephone the service provider's central computer 4 and be connected to an operator 18. The subscriber will request to update the subscriber database 30 or private contact database 34. For security, the operator 18 will connect the subscriber to an automated system under the control of the services provider central computer. The automated system will ask for the contact name, location at which to reach the contact and telephone number corresponding to the location. The automated system also will ask for a ranking by day of the week and time of day of the locations at which to reach the contact. The subscriber will provide the information requested and the automated system will confirm the provided information. The services provider central computer 4 will associate the contact name with the provided telephone number and save the resulting file in encrypted form in the subscriber's private contact database 34. The automated system will use a similar process to update the subscriber database 30.

The use of the automated update system increases the security of the subscriber' information. No one has access to the numbers of the contacts in a subscriber's contact list or to the numbers of the dedicated telephones of subscriber. The subscriber can gain access to the numbers in the contact list through the service provider's administrators, but not through the operators 18. If the subscriber creates sub-accounts; for example, for family members, the subscriber does not have access to contact information associated with the sub-accounts.

Figure 6:
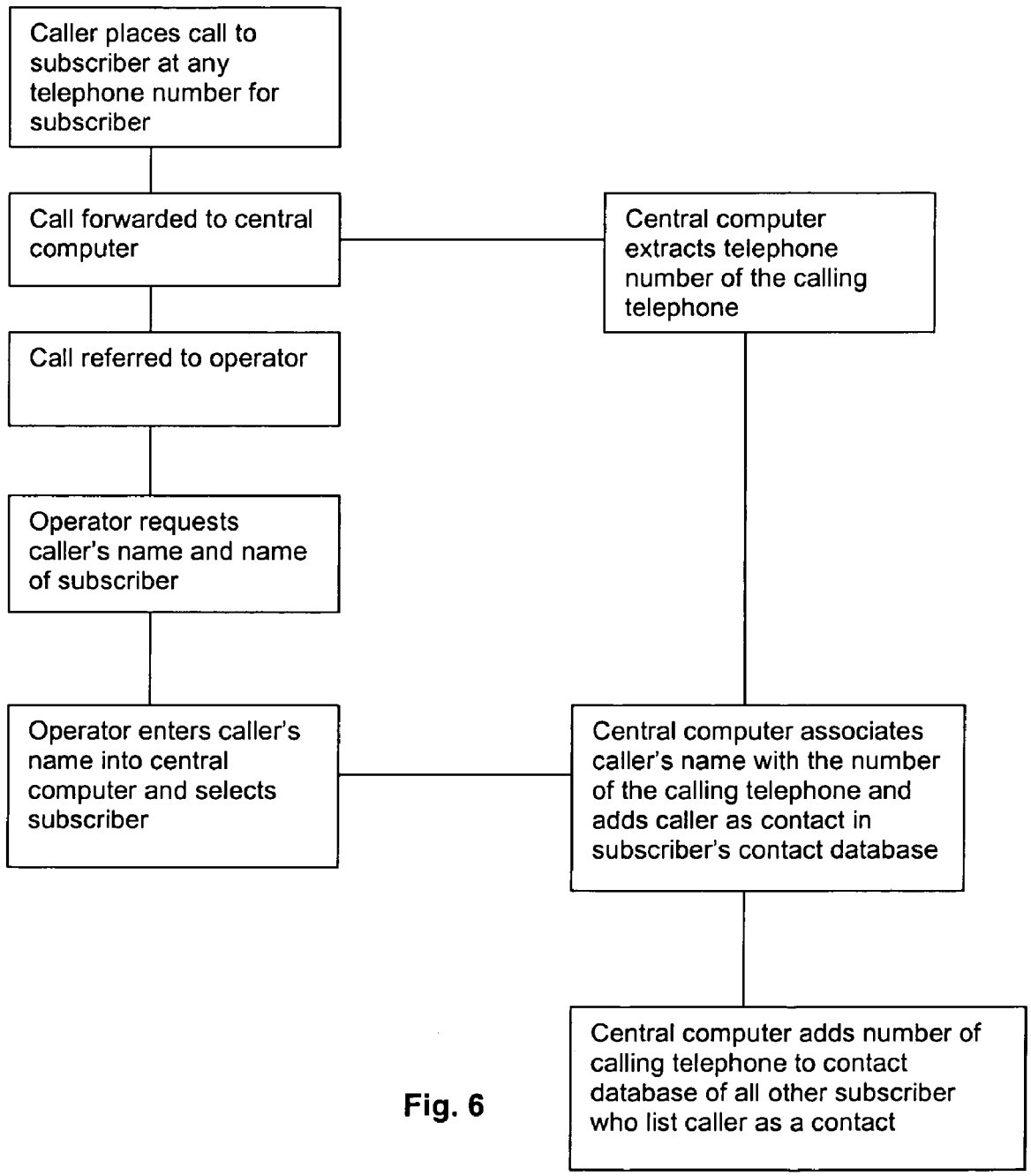
FIG. 6 is a flowchart of the 'call trap' method of updating the database.

The private contact database 34 also is populated by the service provider without active participation by the subscriber through use of a 'call trap' feature, as illustrated by FIG. 6. Each incoming call to a subscriber is received by the central computer. The central computer 4 receives ANI, MIN or other data along with the dial string of the incoming telephone call. The central computer 4 extracts the telephone number of the calling telephone from the data received. The central computer 4 routes the call to the operator 18. The operator 18 greets the caller and asks for the caller's name and for the name of the subscriber. The operator 18 enters the caller's name into the central computer. The central computer 4 associates the caller's name with the telephone number extracted from the incoming call and adds the name and number to the subscriber's private contact database 34. If the name already appears in the subscriber's private contact database 34 but the extracted telephone number does not, the central computer 4 will add the telephone number to the list of telephone numbers at which the contact may be reached. If more than one number exists for the contact in the private contact database 34, the number of the calling telephone is added to the end of the ranked list of locations and corresponding telephone numbers at which to reach the contact.

As shown by FIG. 6, the central computer 4 also will update the private contact database 34 of each other subscriber as a result of the incoming call. If the name of the caller appears as a private contact on any other subscriber's private contact database 34, the extracted number of the calling telephone will be added to the list of telephone numbers for the contact on every other subscriber's private contact database 34. The subscribers are not notified of these changes; instead, the changes are automatically incorporated into the private contact databases 34 for each subscriber. As before, the central computer 4 will add the telephone number for the caller to the end of the ranked list of locations at which to reach the contact in each applicable private contact database 34.

Figure 7:
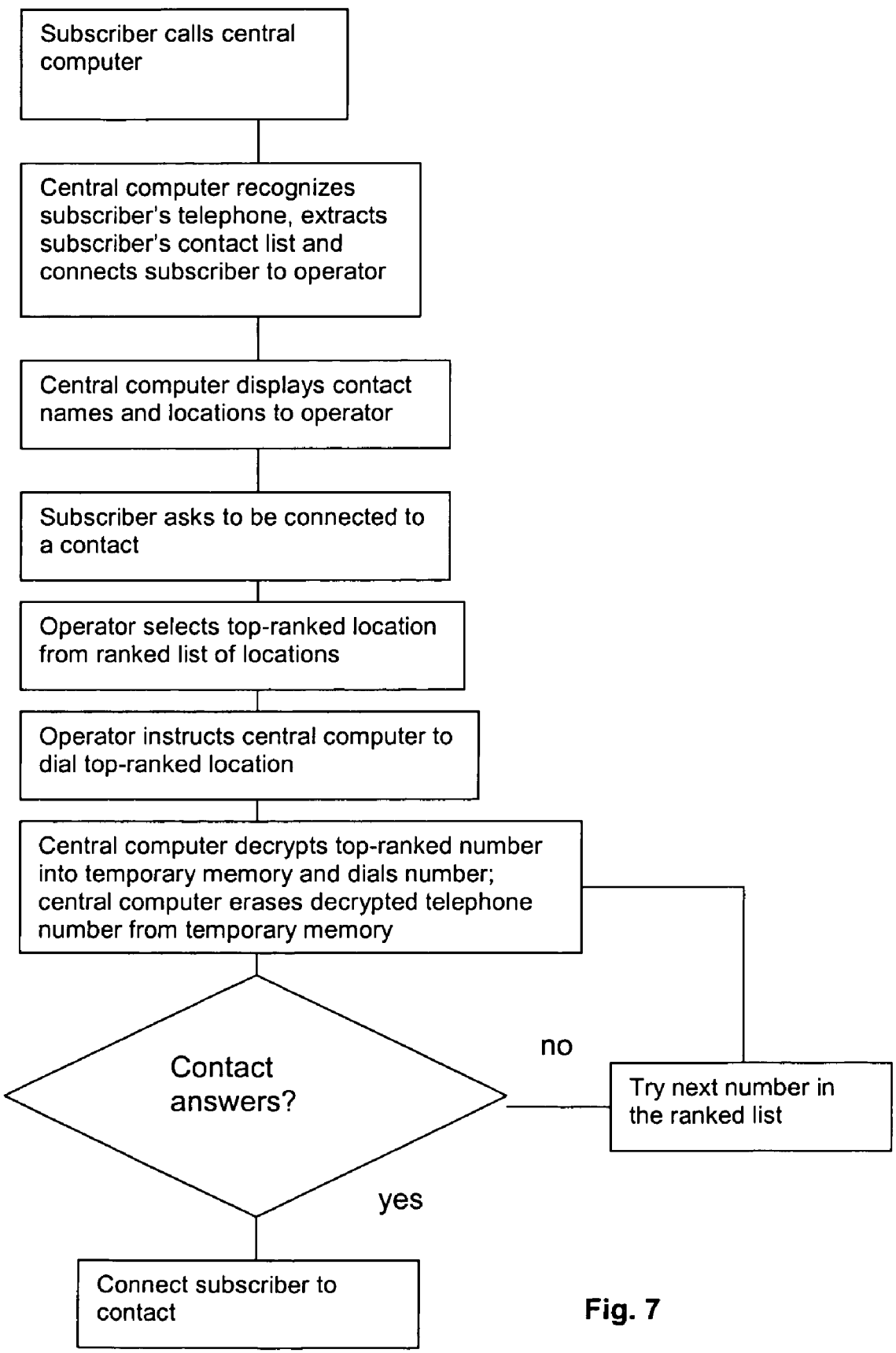
FIG. 7 is a flowchart of the handling of an outgoing call.

The process of completing an outgoing call is illustrated by FIG. 7. To place an outgoing call, a subscriber connects to the central computer 4 by picking up the dedicated landline telephone handset or by pressing a button on the dedicated wireless phone. An automatic dialer in the landline telephone or a number pre-programmed into the wireless phone connects the subscriber to the central computer. The central computer 4 identifies the subscriber by ANI, MIN or other information transmitted by the dedicated telephone from which the subscriber calls. The central computer 4 connects the outgoing call to the operator 18. The central computer 4 simultaneously decrypts and displays to the operator 18 the name or other designation of each private contact in the subscriber's private contact database 34 plus the ranked locations (such as "office," "home," "cell") at which to reach each contact. The top-ranked locations displayed to the operator 18 are the locations at which each contact is most likely to be located at the time of day and day of the week of the call. The central computer 4 does not display the actual telephone number of either a contact or the subscriber to the operator 18.

The subscriber identifies a contact by name and directs the operator 18 to place a call to the contact. The operator 18 locates the name of the contact in the private contact list and instructs the central computer 4 to initiate a call to the top-ranked location for the contact. The central computer 4 wilt retrieve from the private contact database 34 the telephone number corresponding to the selected location and will decrypt and retrieved telephone number and store the decrypted telephone number in temporary memory. The central computer 4 then will dial the decrypted telephone number. If the operator 18 is not able to locate the private contact at the first location tried, the operator 18 tries the subsequent locations on the list until and operator 18 connects to the contact or the contact locations are exhausted. The operator 18 connects the subscriber to the contact after the connection to the contact is established. The central computer 4 will erase each decrypted telephone number from temporary memory after dialing the decrypted telephone number.

Figure 8:
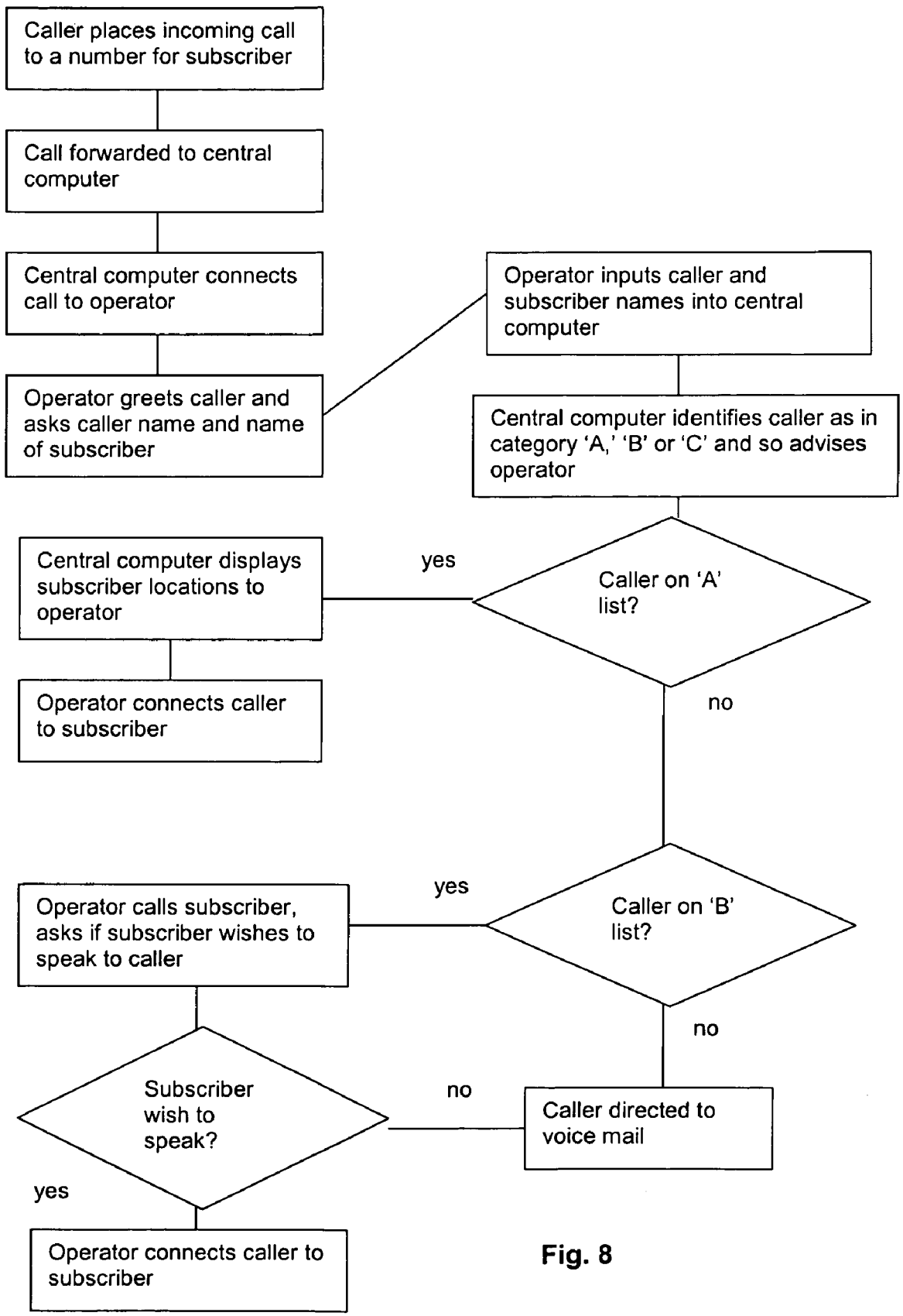
FIG. 8 is a flowchart of the handling of an incoming call.

The receipt of an incoming call by a caller to subscriber is illustrated by FIG. 8. A subscriber may have one or more telephone numbers that are known to other persons, such as home, business and wireless telephone numbers. All calls to the subscriber at any number are permanently forwarded to the central computer 4 and hence to an operator 18 employed by the service provider. A caller is not able to reach the subscriber without first speaking with the operator 18 employed by the service provider. The operator 18 will not see and wilt not have access to the telephone number of the calling party or of the subscriber.

The operator 18 greets the caller and asks the name of the caller and of the subscriber. The operator 18 enters this information into the central computer. The central computer 4 identifies whether the caller is listed as an "A," "B" or "C" contact in the subscriber's contact list, hence screening the call to subscriber. The central computer 4 will identify the classification of the caller to the operator 18. For callers on the "A" or "B" call screening lists, the central computer 4 will display to the operator 18 the contact locations for subscriber, ranked by time of day and day of the week. The operator 18 will not see the number of the subscriber, but wilt see categories, such as 'home,' 'office' or 'cell.' If the operator 18 answers a call to a subscriber from a caller on the subscriber's 'A' list, the operator 18 will instruct the central computer 4 to dial the subscriber at the top-ranked location for subscriber for that time of day and day of the week. The central computer 4 will retrieve from the subscriber database 30 the telephone number corresponding to the selected location and wilt decrypt the retrieved telephone number, store the decrypted telephone number in temporary memory, and dial the decrypted telephone number. The operator 18 then will connect the subscriber to the caller. If the operator 18 is unsuccessful at the first location called, the operator 18 will proceed along the list of locations for subscriber until the operator 18 reaches subscriber or exhausts the possible locations at which to reach subscriber. Once the connection to the subscriber is established, the operator 18 then will connect the caller to the subscriber. Depending on the preference of the subscriber, the caller on the 'A' list may be announced by the operator 18 or connected directly without announcement. The central computer 4 will erase each decrypted telephone number from temporary memory after dialing the decrypted telephone number.

If a caller is on the 'B' list, the operator 18 will call the subscriber and ask the subscriber whether the subscriber would like to speak with the caller. If so, the operator 18 will connect the caller to the subscriber. If not, the operator 18 will divert the caller to voicemail for the subscriber.

Callers on the 'C' list, including persons who are not otherwise categorized, are invited to leave a message on voice mail. At any time, the subscriber may direct operator 18 to move a person from one list to another and to thereby change the way incoming calls from the person are handled.

The subscriber may retrieve voice mails by calling the operator 18 and requesting voice mail. The voice mail offered by the service provider is not sequential. The voice mail is organized by caller and by time received, so that the subscriber subsequently is advised of the names and number of times each of the persons has called. The subscriber may select among the voice mails. The most recent call from a caller is presented first in the hierarchy of messages from that caller.

If subscriber location or private contact location information becomes outdated, the central computer 4 may notify the subscriber to manually update the information. The central computer 4 records the success of reaching a contacts or the subscriber and compares success in reaching the contact or the subscriber consistent with the ranked lists. If the degree of success in reaching the contact or subscriber at a particular location is less than a predetermined criterion, the service provider may notify the subscriber that the database should be updated. The updating of the database may be accomplished either through the method of a personal visit by the service provider representative or through use of the automated speech recognition system.

Alternatively, the ranked lists for subscriber locations and for private contact locations may be re-ranked permanently (or until changed by the subscriber) based on the success in placing calls to the subscriber or contact. The central computer 4 wilt record the success in reaching the subscriber and each contact at each location on the ranked list of locations at which the subscriber or the contact may be reached. The central computer 4 will move locations at which the subscriber or contact is successfully reached higher in the ranked list for the day and time of placing the call. The central computer 4 will move tower in the ranked list for the day and time those locations at which the central computer 4 has been less successful in reaching the contact or subscriber.

The central computer 4 may identify the locations from which incoming calls to the central computer 4 are made, such as incoming calls by the subscriber or by a personal contact of the subscriber. The location information appears in the dial string for the incoming call. For a call from a landline telephone, the identifying information includes the ANI. The central computer 4 can determine the geographic location of the exchange from which the call was made using the ANI. The location information for a wireless telephone will include the mobile identification number ("MIN") and may include calling number delivery, calling name delivery, calling name and number delivery, GPS coordinates, group ANI or actual ANI. A "group ANI" is an identifier assigned to a group of cellular telephones and does not identify a particular telephone. The group ANI includes a local exchange number. The central computer 4 can determine the geographic location of the calling wireless telephone by comparing the local exchange number with a standard local exchange routing guide ('LERG') database.

As illustrated by FIG. 9, the ranked list of locations at which to reach a subscriber or a contact may be re-ranked permanently (or until changed by the subscriber) based on the location from which a call was received from the subscriber or the contact to the central computer. As noted above, the central computer 4 may extract calling telephone number and other location information from an incoming telephone call by the subscriber or by a contact to the central computer. The central computer 4 may infer that a location from which the service provider received a call from the subscriber or contact for a day of the week and time of the day is a reasonable location at which to reach the subscriber or contact for that time of the day and day of the week. The central computer 4 may permanently re-rank the ranked calling list for the subscriber or contact to move higher on the ranked list those locations from which the central computer 4 has received more calls from subscriber or a contact and to move lower on the ranked list those locations from which the central computer 4 has received fewer calls from subscriber or a contact.

Figure 10:
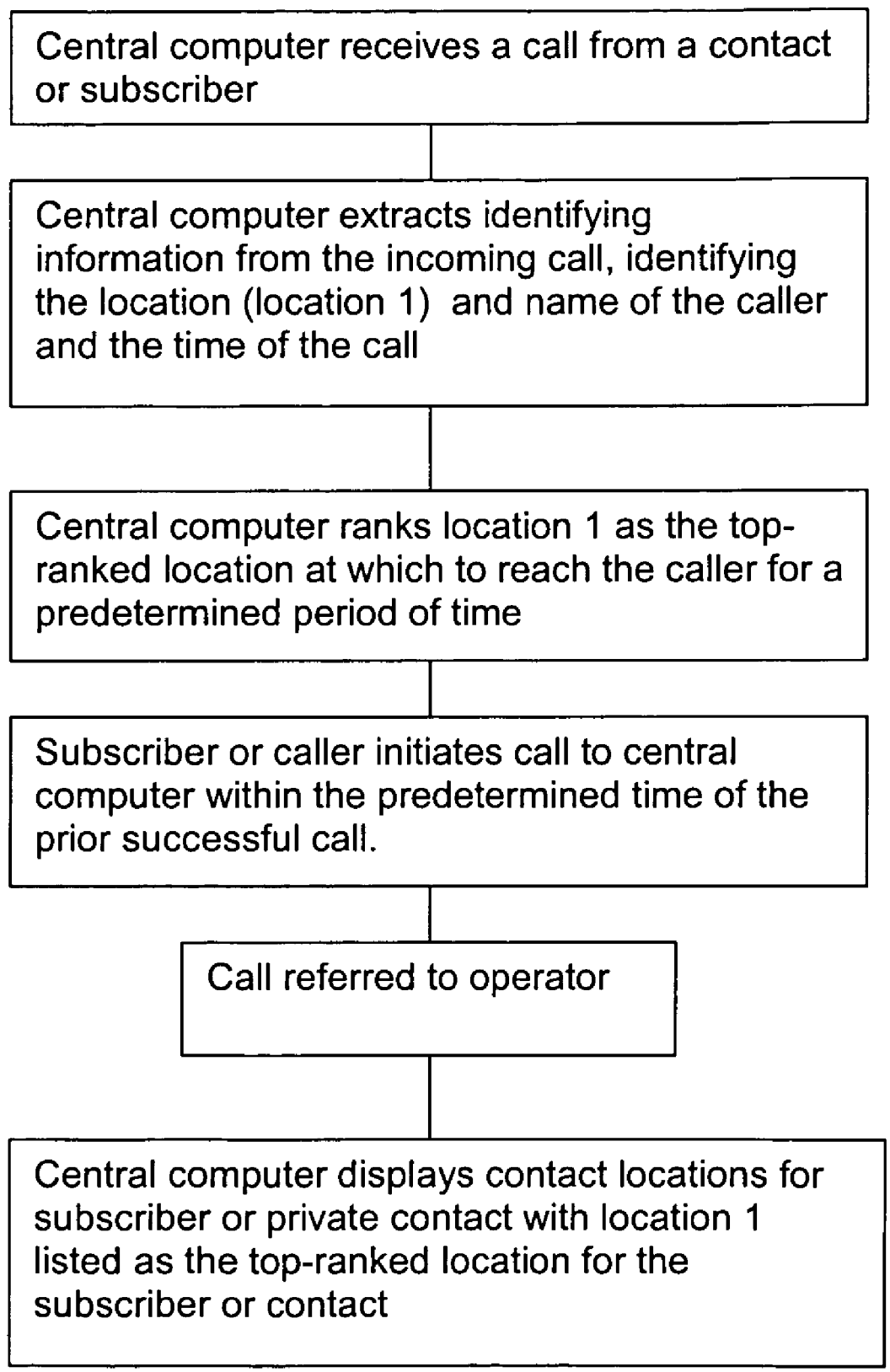
FIG. 10 is a flowchart of a method for a temporary override of the ranked list based on a recently received call.

As shown by FIG. 10, the central computer 4 may temporarily override (for example, for thirty minutes) the ranked list of locations at which to reach the subscriber or a contact based on a recent call by a contact or the subscriber to the central computer. As noted above, the service provider can examine information accompanying a call received from a contact or subscriber and extract location information for the telephone from which the call originated. The central computer 4 may infer that the location from which the central computer 4 received a call from the subscriber or contact within a predetermined period of time is a reasonable location at which to locate the subscriber or contact. The services provider will override the ranked list of locations and place the location from which the central computer 4 received the recent call as the top-ranked location at which to reach subscriber or contact.

The temporary override of the ranked list of locations applies not only to the location from which a previous call was made but also to locations in geographic proximity to the location from which the previous call was made. For example, if the contact or subscriber has multiple telephone numbers in New York, Chicago and San Francisco, a recent call from the contact or subscriber using a landline with an ANI indicating call origination in northern Illinois implies that the Chicago contact numbers are more likely to be successful than the San Francisco contact numbers. The central computer 4 will override the specified ranked location list for the contact or subscriber and place the Chicago contact numbers at or near the top of the ranked list.

The temporary override of the ranked list of locations for subscriber or a contact also applies to calls received from wireless telephones. For a contact or subscriber using a wireless telephone, the group ANI and local exchange number received from a wireless telephone for a contact or subscriber will allow the central computer 4 to determine the location of the caller. The locations for the contact or subscriber listed in the database that are in geographic proximity to the location from which the call was made therefore are likely locations at which to reach the contact. The central computer 4 will temporarily override the specified ranked location list for the contact or subscriber and place the locations in geographic proximity to the source of the previous call at or near the top of the ranked list for a predetermined period of time, for example thirty minutes, after the receipt of the first call.

Figure 11:
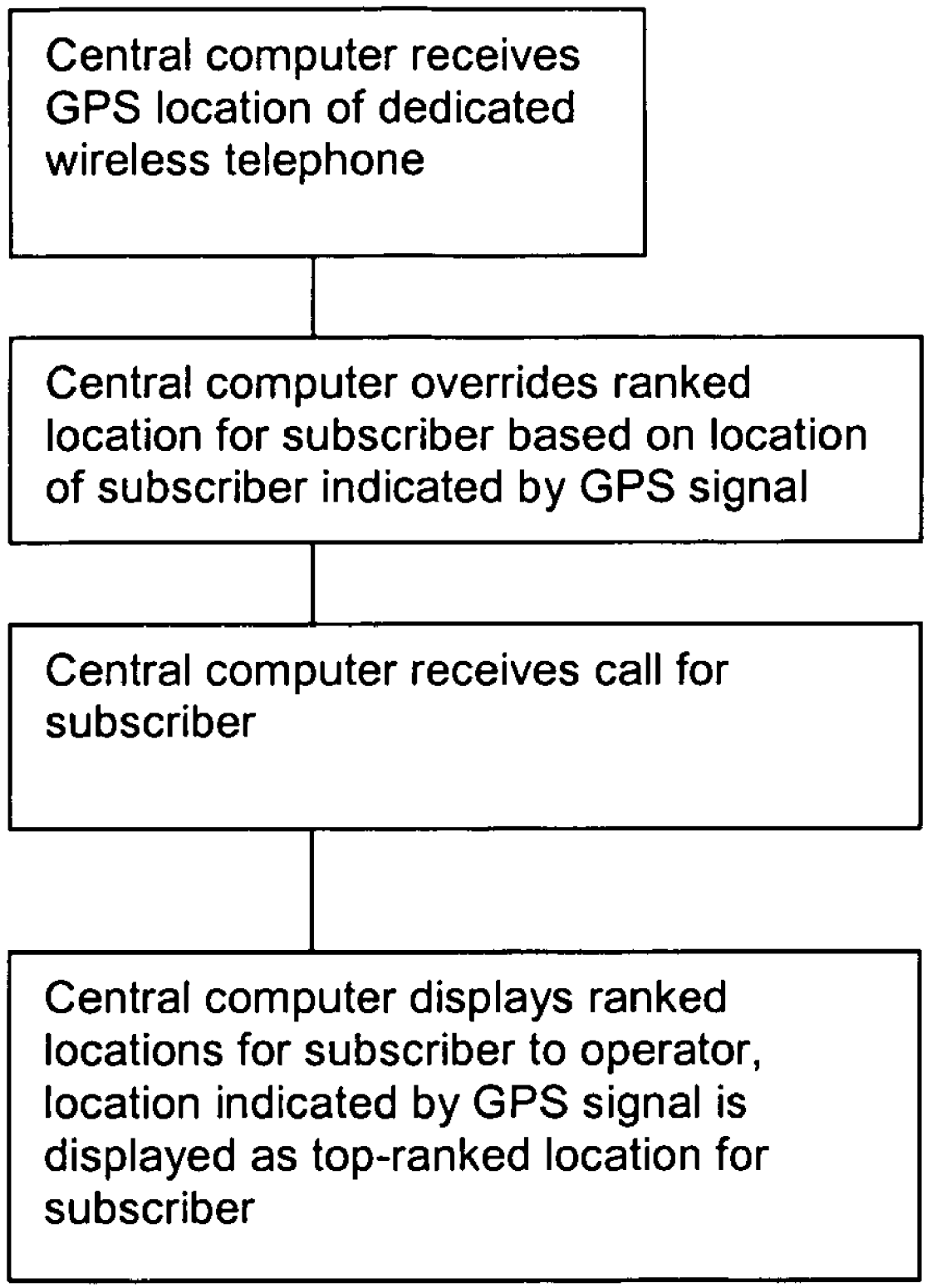
FIG. 11 is a flowchart of a method for overriding the ranked list based on GPS data received.

As shown by FIG. 11, the central computer 4 may override the ranked list of locations for the subscriber based on a Global Positioning System (GPS) signal received from the dedicated wireless telephone provided to subscriber. The dedicated wireless telephone may include a GPS receiver. If the telephone is turned on, the telephone is periodically determining its position using conventional means and transmitting that position to the central computer. The GPS-equipped wireless telephone may also be queried remotely to determine its location. The service provider can receive the transmission of GPS information and identify the subscriber-specified contact location at which the subscriber is most likely to be located. For example, if the subscriber's wireless telephone is turned on and located at the office, a call to the subscriber's office landline telephone is likely to reach the subscriber. The central computer 4 can identify the location of the subscriber's dedicated wireless telephone, override the specified ranked list of locations for subscriber, and place the subscriber's office at the top of the ranked list.

Using current technology, a dedicated wireless telephone may not be able to receive the signals of GPS satellites when the wireless telephone is inside a building. The service provider's central computer 4 will overcome this shortcoming by maintaining a record of the GPS-indicated location of the wireless telephone and inferring that the subscriber is still located at the point where the GPS information from the wireless telephone was last received. The central computer 4 automatically will override the subscriber-specified locations at which to reach subscriber to indicate as the top-ranked location the location on the ranked list that is closest to the last known position of the GPS-equipped wireless telephone.

Recording the subscriber's location using a GPS-equipped wireless telephone introduces its own security concerns. A subscriber may be reluctant to allow a service provider to use the GPS-equipped wireless telephones to track the movement of the subscriber. To overcome this reluctance, the central computer 4 may be programmed to continuously overwrite the GPS location information so that, for example, a rolling eight hours of GPS location information is stored in computer memory. At the end of eight hours, GPS location information is erased and the memory is overwritten. The service provider will have no more than eight hours of GPS information relating to the subscriber.

The central computer 4 alternatively may track the location of the subscriber using triangulation among wireless telephone towers, as is known in the art, and may use the resulting subscriber location information as described above for GPS tracking information. If the service provider collects location information of the subscriber using wireless telephone tower triangulation, the central computer 4 will be programmed to provide similar information security, as by periodically erasing and overwriting the location information in computer memory.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

We claim:

1. A valet telephone system apparatus, the apparatus comprising:
   a. a dedicated wireless telephone assigned to a subscriber
   b. a central computer accessible by an operator, said central computer being configured to receive an outgoing call from said subscriber using said dedicated wireless telephone, said dedicated wireless telephone being configured to place said outgoing telephone call only to said central computer, said central computer being configured to connect said outgoing telephone call from said dedicated wireless telephone to said operator;
   c. a private contact database accessible to said computer, said private contact database comprising a name of a private contact, a private contact location at which said private contact is to be reached and a private contact telephone number corresponding to said private contact location, said central computer being configured to allow said operator to connect said subscriber to said private contact at said private contact location as directed by said subscriber, said central computer being configured not to display said private contact telephone number to said operator, whereby said dedicated wireless telephone and said central computer are configured so that said outgoing call by said subscriber using said dedicated wireless telephone is completed only by said operator, wherein said private contact location is a one of a plurality of said private contact locations and wherein said private contact telephone number is a one of a plurality of said private contact telephone numbers, each of said plurality of said private contact locations having an associated one of said plurality of said private contact telephone numbers, said plurality of locations at which said private contact is to be reached being ranked by a time and a day of a week, whereby said operator will complete said outgoing call by said subscriber to a selected one of said ranked plurality of said locations at which said private contact is to be reached.

2. A valet telephone system apparatus, the apparatus comprising:
   a. a dedicated wireless telephone assigned to a subscriber
   b. a central computer accessible by an operator, said central computer being configured to receive an outgoing call from said subscriber using said dedicated wireless telephone, said dedicated wireless telephone being configured to place said outgoing telephone call only to said central computer, said central computer being configured to connect said outgoing telephone call from said dedicated wireless telephone to said operator;
   c. a private contact database accessible to said computer, said private contact database comprising a name of a private contact, a private contact location at which said private contact is to be reached and a private contact telephone number corresponding to said private contact location, said central computer being configured to allow said operator to connect said subscriber to said private contact at said private contact location as directed by said subscriber, said central computer being configured not to display said private contact telephone number to said operator, whereby said dedicated wireless telephone and said central computer are configured so that said outgoing call by said subscriber using said dedicated wireless telephone is completed only by said operator, wherein said dedicated wireless telephone is configured to receive an incoming telephone call only from said central computer, said central computer being configured to receive said incoming call to said subscriber and to connect said operator to said incoming call, said central computer being configured to allow said operator to screen said incoming call and to connect said incoming call to said dedicated wireless telephone, whereby each said incoming call to said dedicated wireless telephone assigned to said subscriber is screened by said operator.

3. The valet telephone system apparatus of claim 2 wherein said central computer has a computer telephone number and said subscriber has an outside subscriber telephone number, said outside subscriber telephone number being permanently forwarded to said computer telephone number, whereby all said incoming calls to said subscriber at said outside subscriber telephone number are screened by said operator.

4. The valet telephone system apparatus of claim 2 wherein said configuration of said central computer to allow said operator to screen said incoming call and to connect said incoming call to said subscriber comprises: a computer memory operably associated with said central computer, said computer memory being configured to store a subscriber database, said subscriber database comprising a plurality of locations at which to reach said subscriber, each of said plurality of locations at which to reach said subscriber having an associated subscriber telephone number, said plurality of locations at which to reach said subscriber being ranked by said time and said day of said week, said central computer being configured to display said plurality of said ranked subscriber locations to said operator upon receipt of said incoming call to said subscriber, said central computer being configured to receive a command from said operator to connect said incoming call to a selected one of said plurality of said ranked locations at which to reach said subscriber, said central computer being configured to connect said incoming call to said subscriber telephone number associated with said selected one of said plurality of locations, said central computer being configured not to reveal said associated subscriber telephone number to said operator, whereby upon screening said incoming call said operator connects said incoming call to said subscriber based on said ranked list of locations at which to reach subscriber.

5. The valet telephone system apparatus of claim 4 wherein said incoming call is received from a calling party, said subscriber being a first subscriber, said central computer being configured to receive and to record a sending telephone number received with said incoming call, said central computer being configured to receive a name of said calling party from said operator, said central computer being configured to associate said name of said calling party with said sending telephone number, said central computer being configured to add said name of said calling party and said associated sending telephone number to said private contact database of said first subscriber, said central computer being configured to not display said sending telephone number to said operator, whereby for said incoming call said private contact database of said subscriber is supplemented to include said name of said calling party and said associated sending telephone number from which said calling party places said incoming call.

6. The valet telephone system apparatus of claim 5 wherein said first subscriber is a one of a plurality of subscribers, said private contact database is a one of a plurality of private contact databases, said central computer being configured to store each other of said plurality of private contact databases in association with a one other of said plurality of subscribers, said central computer being configured to store said sending telephone number in association with said name of said calling party in said each other of said plurality of private contact databases that also includes said name of said calling party, whereby said private contact database of each other of said plurality of said subscribers that includes said name of said calling party is supplemented to include said sending telephone number from which said calling party places said incoming call.

7. The valet telephone system apparatus of claim 4, the apparatus further comprising: a laptop computer, said laptop computer being configured to receive a data file, said data file comprising said private contact database and said subscriber database, said data file being entered into said laptop by a service provider representative, by said subscriber or by an agent of said subscriber while said laptop is at a location specified by said subscriber, said laptop being configured to save said data file in encrypted form, said laptop computer being configured to transmit said encrypted data file to said central computer over a direct dial wireline connection, said central computer being configured to receive said encrypted data file and to store said data file in encrypted form in said computer memory, said encrypted data file being stored in said laptop in a laptop memory, said laptop computer being configured for either transfer of control of said laptop memory to said subscriber or destruction of said laptop memory upon transmission of said encrypted data file to said central computer, whereby creation and transmission of said data file is secure from loss or theft.

8. The valet telephone system apparatus of claim 7, the apparatus further comprising: an automated data collection system, said central computer being configured to connect said outgoing call from said subscriber to said automated data collection system upon receiving an instruction from said operator, said automated data collection system being configured to apply a speech recognition algorithm to a verbal command from said subscriber to update said subscriber database or said private contact database, said central computer being configured to store said updated private contact database in encrypted form, whereby said subscriber updates said subscriber database or private contact database without disclosing said contact telephone number or said subscriber telephone number to said operator.

9. The secure valet telephone system apparatus of claim 4 wherein said configuration of said dedicated wireless telephone to receive said incoming telephone call from said central computer comprising:
  a. said dedicated wireless telephone having a dedicated wireless telephone number, said central computer being configured to transmit an identifying information identifying said central computer when said central computer initiates said connection to said dedicated wireless telephone;
  b. said dedicated wireless telephone being configured to detect said identifying information, said dedicated wireless telephone being configured to generate an alert to said subscriber of said incoming call only when said dedicated telephone receives said identifying information identifying said central computer.

10. The secure valet telephone system apparatus of claim 9 wherein said central computer is configured to decrypt said private contact database and to store said private contact database in decrypted form in a temporary memory upon receipt by said central computer of said outgoing call from said subscriber using said dedicated wireless telephone, said central computer being configured to erase said decrypted form of said private contact database from said temporary memory upon establishment of a connection of said subscriber to said private contact by said central computer as directed by said subscriber, whereby said private contact telephone number is maintained in decrypted form only to place said outgoing call to said private contact.

11. The secure valet telephone system apparatus of claim 10 wherein said central computer is configured to decrypt and store in said temporary memory of a one of said plurality of subscriber telephone numbers in response to a command by said operator to said central computer to dial said one of said plurality of said subscriber telephone numbers, said central computer being configured to erase said decrypted subscriber telephone number from said temporary memory upon completion of dialing of said subscriber telephone number by said central computer, whereby said subscriber telephone number is maintained in decrypted form only long enough to connect said incoming call to said subscriber.

12. The secure valet telephone system apparatus of claim 11 wherein said central computer is configured not to reveal said one of said plurality of said contact telephone numbers or said one of said plurality of said subscriber telephone numbers to any person, and wherein said central computer is configured so that said central computer cannot be connected to an Internet, whereby said one of said plurality of said contact telephone numbers and said one of said plurality of said subscriber telephone numbers are not vulnerable to a hacker.

13. A method of providing a valet telephone service, the method comprising:
   a. traveling by a service provider representative to a location specified by a subscriber;
   b. inputting a plurality of contact names and a plurality of contact telephone numbers of said subscriber into a memory of a portable computing device;
   c. encrypting said plurality of contact names and contact telephone numbers to form an encrypted data file while said service provider representative is present at said location specified by said subscriber;
   d. placing said portable computing device in communication with a central computer using a direct dial wireline telephone connection while said service provider representative is present at said location specified by said subscriber;
   e. transmitting by said portable computing device of said encrypted data file to said central computer over said direct dial wireline telephone connection;
   f. performing an action while said service provider representative is present at said location specified by said subscriber, said action being selected from a list consisting of transferring ownership and custody of said portable computing device to said subscriber, removing physically said memory of said portable computing device and transferring ownership and custody of said memory to said subscriber, destroying said portable computing device memory, and erasing said portable computing device memory;
   g. storing by said central computer of said encrypted data file in encrypted form as a private contact database for said subscriber.

14. The method of claim 13, the method further comprising:
   a. receiving a database update telephone call by said subscriber to said central computer, said central computer being configured to connect said database update call to an operator;
   b. instructing by said operator to said central computer for said central computer to connect said database update telephone call to an automated data collection system;
   c. connecting by said central computer of said subscriber to said automated data collection system;
   d. applying a speech recognition algorithm by said automated data collection system to a verbal command by said subscriber to update said private contact database;
   e. storing in encrypted form by said central computer of said updated private contact database, whereby said subscriber updates said private contact list without disclosing said plurality of said contact telephone numbers to said operator.

15. The method of claim 14, the method further comprising:
   a. supplying by a service provider to said subscriber of a dedicated telephone, said dedicated telephone and said central computer being configured so that said dedicated telephone receives an incoming call only from said central computer;
   b. receiving by said central computer of an incoming telephone call to said subscriber;
   c. directing by said central computer of said incoming telephone call to said operator;
   d. screening said incoming telephone call by said operator;
   e. directing by said operator that said central computer initiate a connection of said incoming call to said dedicated telephone of said subscriber, whereby said incoming call to subscriber is screened by said operator to prevent an unauthorized access to said subscriber.

16. The method of claim 15 wherein said configuration of said dedicated telephone and said central computer so that said dedicated telephone receives an incoming call only from said central computer comprising:
   a. said dedicated telephone having a dedicated telephone number, said central computer being configured to transmit an identifying information identifying said central computer when said central computer initiates said connection to said dedicated telephone;
   b. said dedicated telephone being configured to detect said identifying information, said dedicated telephone being configured to generate an alert to said subscriber of said incoming call only when said dedicated telephone receives said identifying information identifying said central computer.

17. The method of claim 16 wherein said central computer is configured to decrypt said private contact database and to store said private contact database in decrypted form in a temporary central computer memory upon receipt of an outgoing call by said central computer from said subscriber using said dedicated telephone, said central computer being configured not to reveal a one of said plurality of contact telephone numbers to said operator, said central computer being configured to erase said decrypted form of said private contact database from said temporary computer memory upon establishment of a connection of said subscriber to a private contact by said central computer as directed by said subscriber, whereby said private contact database is maintained in decrypted form only long enough to place a call to a private contact.

18. The method of claim 17, the method further comprising:
   a. maintaining by said central computer of a subscriber database of a plurality of subscriber locations and a plurality of subscriber telephone numbers at which to reach said subscriber ranked by a time and a day of a week, said subscriber database being stored in encrypted form;
   b. decrypting and storing in said central computer temporary memory of a one of said plurality of subscriber telephone numbers in response to a command by said operator to said central computer to dial said one of said plurality of said subscriber telephone numbers;
   c. erasing from said temporary memory of said decrypted subscriber telephone number immediately upon completion of dialing of said subscriber telephone number by said central computer, whereby said subscriber database is maintained in decrypted form only long enough to complete said incoming call to said subscriber.

19. The method of claim 18 wherein said central computer is configured not to reveal said one of said plurality of said contact telephone numbers or said one of said plurality of said subscriber telephone numbers to any person other than subscriber, and wherein said central computer is configured so that said central computer cannot be connected to an Internet, whereby said subscriber database and said private contact database are not vulnerable to a hacker.

20. An apparatus for providing a valet telephone service, the apparatus comprising: a central computer, said central computer being configured to store a private contact database associated with a subscriber, said private contact database including a name of a contact and a plurality of possible locations at which to reach said contact, each of said plurality of possible locations at which to reach said contact having an associated telephone number, said central computer being configured to display said plurality of said possible locations at which to reach said contact to an operator upon receipt by said central computer of an outgoing telephone call from said subscriber, said central computer being configured to display said plurality of possible locations at which to reach said contact to said operator in a ranked list, said central computer being configured to connect said outgoing call by said subscriber to a top-ranked possible location at which to reach said contact upon direction by said operator, said central computer being configured to re-rank said ranked list of said plurality of possible locations at which to reach said contact based upon receipt by said central computer of an incoming telephone call by said contact to said subscriber within a predetermined period of time prior to a time of said outgoing call by said subscriber to said contact.

21. The apparatus of claim 20 wherein said re-ranking of said ranked list of said plurality of possible locations at which to reach said contact comprising: said central computer being configured to select a one of said plurality of possible locations at which to reach said contact as said top-ranked location at which to reach said contact, said selected one of said plurality of possible locations at which to reach said contact being selected to be in geographic proximity to a point of origin of said incoming call to said subscriber from said contact, and wherein said central computer is configured to receive an item of contact location information during said incoming call from said contact to said central computer, said item of contact location information specifying said location from which said contact places said incoming call to said central computer, said item of contact location information being MIN or ANI information.

22. The apparatus of claim 20, said central computer being configured to store a list of a plurality of possible subscriber locations, said central computer being configured to display said plurality of said possible subscriber locations to said operator in a ranked list of said possible subscriber locations, said central computer being configured to re-rank said ranked list of said plurality of possible subscriber locations based upon receipt by said central computer of a telephone call by said subscriber within a predetermined period of time prior to receipt of said incoming call to said subscriber, wherein said central computer is configured to display a one of said plurality of possible subscriber locations as a top-ranked possible subscriber location to said operator when said central computer displays said ranked list of said possible subscriber locations to said operator, said re-ranking of said ranked list of said possible subscriber locations comprising: said central computer being configured to select as said top-ranked location a one of said plurality of possible subscriber locations from which said subscriber placed said telephone call to said central computer within said predetermined period of time.

* * * * *